United States Patent
Shishido et al.

(10) Patent No.: US 9,288,432 B2
(45) Date of Patent: Mar. 15, 2016

(54) MOTION VECTOR CORRECTION DEVICE AND METHOD AND VIDEO SIGNAL PROCESSING APPARATUS AND METHOD

(75) Inventors: Tomoyuki Shishido, Kawasaki (JP); Hiroshi Noguchi, Yokohama (JP); Hideki Aiba, Moriya (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 843 days.

(21) Appl. No.: 13/521,390

(22) PCT Filed: Mar. 9, 2011

(86) PCT No.: PCT/JP2011/055520
§ 371 (c)(1),
(2), (4) Date: Jul. 10, 2012

(87) PCT Pub. No.: WO2011/142169
PCT Pub. Date: Nov. 17, 2011

(65) Prior Publication Data
US 2012/0288005 A1    Nov. 15, 2012

(30) Foreign Application Priority Data
May 13, 2010  (JP) ................................. 2010-110962

(51) Int. Cl.
*H04N 7/01*    (2006.01)
(52) U.S. Cl.
CPC ................................... *H04N 7/014* (2013.01)
(58) Field of Classification Search
None
See application file for complete search history.

(56) References Cited

U.S. PATENT DOCUMENTS

| | | | | |
|---|---|---|---|---|
| 5,177,610 A | * | 1/1993 | Wilkinson | H04N 5/145 348/452 |
| 7,561,621 B2 | * | 7/2009 | Itoh et al. | 375/240.16 |
| 7,564,902 B2 | * | 7/2009 | Sasai et al. | 375/240.26 |
| 7,613,364 B2 | * | 11/2009 | Kang et al. | 382/300 |
| 8,331,710 B2 | * | 12/2012 | Kawase et al. | 382/254 |
| 8,432,973 B2 | * | 4/2013 | Yamasaki et al. | 375/240.16 |
| 2008/0063067 A1 | * | 3/2008 | Hirayama et al. | 375/240.16 |

(Continued)

FOREIGN PATENT DOCUMENTS

| | | |
|---|---|---|
| EP | 0395274 A2 | 10/1990 |
| EP | 1903803 A2 | 3/2008 |

(Continued)

OTHER PUBLICATIONS

Kobla et al. ("Compressed domain video indexing techniques using DCT and motion vector information in MPEG video," SPIE3022, Storage and retrieval for Image and Video Databases V, 200, Jan. 15, 1997).*

(Continued)

*Primary Examiner* — William C Vaughn, Jr.
*Assistant Examiner* — Stuart Bennett
(74) *Attorney, Agent, or Firm* — Nath, Goldberg & Meyer; Jerald L. Meyer; Stanley N. Protigal

(57) ABSTRACT

A motion vector detector detects, using pixel data in at least two real frames in an input video signal, a motion vector MV1 necessary for generating interpolated pixel data forming an interpolated frame to be inserted between the two real frames. A motion vector corrector corrects the motion vector MV1 to decrease the magnitude of motion vector MV1 when the magnitude of motion vector MV1 exceeds a predetermined threshold, and outputs it as a motion vector MV3.

16 Claims, 5 Drawing Sheets

(56) References Cited

U.S. PATENT DOCUMENTS

2008/0204592 A1 8/2008 Jia et al.
2011/0261887 A1* 10/2011 Lee et al. ............... 375/240.16

FOREIGN PATENT DOCUMENTS

| EP | 2106122 A1 * | 9/2009 |
|----|----|----|
| JP | 8-508138 A | 8/1996 |
| JP | 2914448 B2 | 6/1999 |
| JP | 2006-331136 A | 12/2006 |
| JP | 3974290 B2 | 9/2007 |
| JP | 2008-67205 A | 3/2008 |
| JP | 4384231 B2 | 12/2009 |

OTHER PUBLICATIONS

European Search Report dated Jan. 22, 2014 seven (7) pages (English).

* cited by examiner

MOTION VECTOR CORRECTION DEVICE AND METHOD AND VIDEO SIGNAL PROCESSING APPARATUS AND METHOD

This is a National Phase Application filed under 35 U.S.C. 371 as a national stage of PCT/JP2011/055520 filed Mar. 9, 2011, and claims priority from Japanese Application No. 2010-110962, filed May 13, 2010, the content of each of which is hereby incorporated by reference in its entirety.

TECHNICAL FIELD

The present invention relates to a motion vector correction device and method and a video signal processing apparatus and method capable of reducing a feeling of visual strangeness in an interpolated image due to a false detection of motion vector.

BACKGROUND ART

When an image display apparatus displays a moving image on a liquid crystal panel thereof, a motion blur occurs frequently in the moving image. In order to reduce a motion blur, an interpolated frame is inserted between real frames in a video signal to increase the number of frames. For example, a frame rate of 60 Hz in a vertical frequency is converted into 120 Hz or more. Then an image display is carried out. In order to carry out a frame rate conversion, a video signal processing apparatus detects a motion vector in an image and generates each interpolated pixel based on the motion vector to obtain an interpolated frame to be inserted between real frames.

A motion vector is generated based on pixel data within a limited range in respective limited frames (e.g., successive two frames). Thus, it is difficult to completely eliminate a false detection of motion vector. In view of the above-described problem, technical improvements for reducing a false detection of motion vector are carried out. As one example, Patent document 1 discloses a frame rate conversion apparatus provided with a motion vector detection device capable of reducing a false detection of motion vector.

CITATION LIST

Patent Literature

Patent document 1: Japanese Patent Application Laid-open Publication No. 2006-331136

SUMMARY OF INVENTION

Technical Problem

In a video signal processing apparatus provided with a motion vector detection device, it is required to reduce a feeling of visual strangeness in an interpolated image due to a false detection of motion vector. In particular, in a case where a detected motion vector is relatively large, when a false detection occurs, a feeling of visual strangeness in an interpolated image is remarkably enhanced.

The present invention is made in view of the above-described problem and has an object to provide a motion vector correction device and method and a video signal processing apparatus and method capable of reducing a feeling of visual strangeness in an interpolated image even when a false detection occurs in a case where a motion vector is relatively large.

Solution to Problem

In order to resolve the above-described conventional technical problem, the present invention provides a motion vector correction device including: a motion vector detector (2) that, using pixel data in at least two real frames in an input video signal, detects a first motion vector necessary for generating interpolated pixel data forming an interpolated frame to be inserted between the two real frames; and a motion vector corrector (4) that corrects the first motion vector to decrease the magnitude of first motion vector when the magnitude of first motion vector exceeds a first threshold.

In the above-described configuration, the motion vector corrector includes: a motion vector value suppressing part (41) that decreases the magnitude of first motion vector exceeding the first threshold at a predetermined rate, and outputs the result as a second motion vector; and a motion vector value converting part (42) that decreases the magnitude of second motion vector to prevent the magnitude of second motion vector from increasing when the magnitude of second motion vector exceeds a second threshold, and outputs the result as a third motion vector.

As a preferable embodiment, the motion vector value suppressing part calculates the second motion vector according to the following calculus equation (the magnitude of first motion vector)×$m/n$+(the first threshold)×$(n-m)/n$, where variables m and n are natural numbers which have a relation of m<n.

The motion vector value converting part holds the magnitude of third motion vector constant within a range in the magnitude of second motion vector from the second threshold to a third threshold more than the second threshold, and decreases the magnitude of third motion vector at a predetermined rate when the magnitude of second motion vector exceeds the third threshold.

As a preferable embodiment, when the magnitude of second motion vector exceeds the third threshold, the motion vector value converting part calculates the third motion vector according to the following calculus equation 2×(the second threshold)+(the third threshold−the second threshold)−(the magnitude of second motion vector).

It is preferable to further include a motion vector state determiner (3) that determines an appearance state of the first motion vector in a screen to generate and output a state determination value, wherein the motion vector corrector varies characteristics of decrease of the magnitude of first motion vector according to the state determination value.

As a preferable embodiment, the motion vector state determiner generates a state determination value that represents an appearance amount of motion vectors indicating how many first motion vectors appear in a screen. As another preferable embodiment, the motion vector state determiner generates a state determination value that represents a distribution state of motion vectors indicating a degree of uniformity or variation of directions of first motion vectors in a screen.

In order to resolve the above-described conventional technical problem, the present invention provides a video signal processing apparatus including: an interpolated pixel data generator (5) that generates interpolated pixel data, using pixel data in at least two real frames in an input video signal and a motion vector corrected by any one of the above-described motion vector correction devices.

Also, in order to resolve the above-described conventional technical problem, the present invention provides a motion vector correction method including: a motion vector detection step for, using pixel data in at least two real frames in an input video signal, detecting a first motion vector necessary for generating interpolated pixel data forming an interpolated frame to be inserted between the two real frames; and a motion vector correction step for correcting the first motion vector to decrease the magnitude of first motion vector when the magnitude of first motion vector exceeds a first threshold.

The motion vector correction step includes: a motion vector value suppressing step for decreasing the magnitude of first motion vector exceeding the first threshold at a predetermined rate, and outputting the result as a second motion vector; and a motion vector value converting step for decreasing the magnitude of second motion vector to prevent the magnitude of second motion vector from increasing when the magnitude of second motion vector exceeds a second threshold, and outputting the result as a third motion vector.

As a preferable embodiment, the motion vector value suppressing step calculates the second motion vector according to the following calculus equation (the magnitude of first motion vector)×$m/n$+(the first threshold)×$(n-m)/n$, where variables m and n are natural numbers which have a relation of m<n.

The motion vector value converting step holds the magnitude of third motion vector constant within a range in the magnitude of second motion vector from the second threshold to a third threshold more than the second threshold, and decreases the magnitude of third motion vector at a predetermined rate when the magnitude of second motion vector exceeds the third threshold.

As a preferable embodiment, when the magnitude of second motion vector exceeds the third threshold, the motion vector value converting step calculates the third motion vector according to the following calculus equation 2×(the second threshold)+(the third threshold−the second threshold)−(the magnitude of second motion vector).

It is preferable to further include a motion vector state determination step for determining an appearance state of the first motion vector in a screen to generate a state determination value, wherein the motion vector correction step varies characteristics of decrease of the magnitude of first motion vector according to the state determination value.

As a preferable embodiment, the motion vector state determination step generates a state determination value that represents an appearance amount of motion vectors indicating how many first motion vectors appear in a screen. As another preferable embodiment, the motion vector state determination step generates a state determination value that represents a distribution state of motion vectors indicating a degree of uniformity or variation of directions of first motion vectors in a screen.

In order to resolve the above-described conventional technical problem, the present invention provides a video signal processing method including: an interpolated pixel data generation step for generating interpolated pixel data, using pixel data in at least two real frames in an input video signal and a motion vector corrected by any of the above-described motion vector correction methods.

Advantageous Effects of Invention

According to the motion vector correction device and method and the video signal processing apparatus and method of the present invention, in a case where a motion vector is relatively large, even when a false detection occurs, it is possible to reduce a feeling of visual strangeness in an interpolated image.

DESCRIPTION OF EMBODIMENTS

Figure 1:
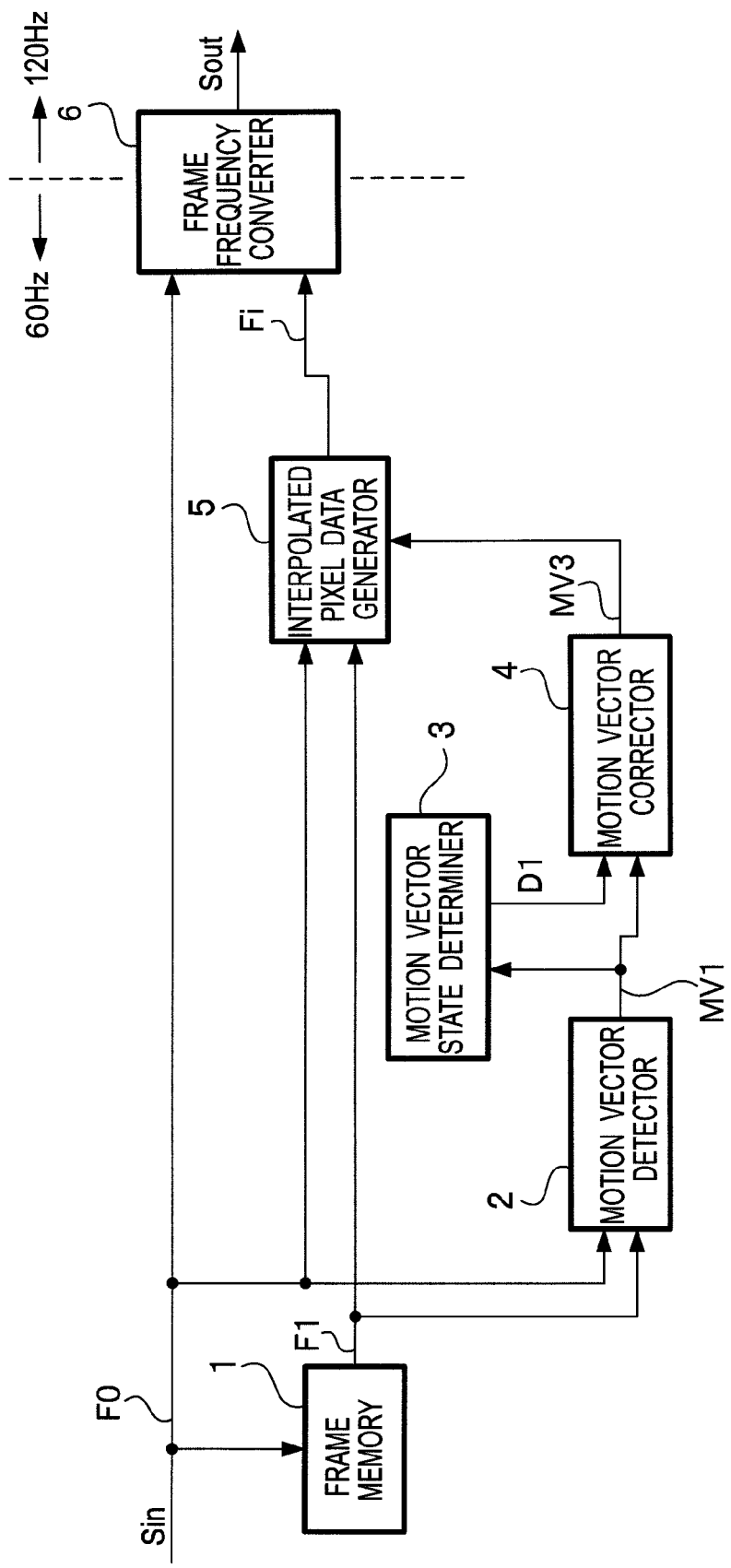
FIG. 1 It is a block diagram that shows one exemplary embodiment of the present invention.

A motion vector correction device and method and a video signal processing apparatus and method will be described below with reference to the drawings. As one example of a video signal processing apparatus, one exemplary embodiment of the present invention shown in FIG. 1 illustrates a frame rate conversion apparatus that inserts an interpolated frame between real frames in a video signal to convert a frame rate two times. The frame rate conversion apparatus may convert a frame rate three times or more. Although the video signal processing apparatus of the present invention is not limited to the frame rate conversion apparatus, it may be a film judder elimination apparatus provided with a motion vector detection device. The present invention is applicable to any video signal processing apparatus provided with a motion vector detection device.

In FIG. 1, pixel data in a video signal Sin having a frame frequency of 60 Hz is sequentially input into a frame memory 1, a motion vector detector 2, an interpolated pixel data generator 5 and a frame frequency converter 6. The frame memory 1 delays input pixel data by one frame and outputs it. A symbol "F0" is defined as a current frame of input video signal Sin. A symbol "F1" is defined as a frame which is one frame prior to the current frame output from the frame memory 1. The current frame F0 and the frame F1 are real frames. Pixel data in the frame F1 is sequentially input into the motion vector detector 2 and the interpolated pixel data generator 5.

The motion vector detector 2 detects a motion vector MV1 to be used to generate interpolated pixel data in an interpolated frame to be inserted between the current frame F0 and the frame F1, using two pieces of pixel data in the current frame F0 and the frame F1 according to a matching method, for example. The motion vector MV1 may be detected in a pixel data unit or a block unit composed of plural pieces of pixel data. The motion vector detector 2 includes plural line memories, a pixel delay part, a subtraction part that calculates a difference of two pieces of pixel data and the like (not shown). The motion vector MV1 is input into a motion vector state determiner 3 and a motion vector corrector 4. The motion vector MV1 may be detected using a past frame prior to the frame F1, in addition to the current frame F0 and the frame F1.

The motion vector state determiner 3 determines a motion vector state in each frame and then outputs a determination signal D1. Concrete operation of the motion vector state determiner 3 will be described later in detail. The determination signal D1 is input into the motion vector corrector 4. The motion vector corrector 4 corrects the motion vector MV1 such that the magnitude of motion vector MV1 is decreased according to the determination signal D1, and then outputs it as a motion vector MV3. Concrete configuration and operation of the motion vector corrector 4 will be described later in detail. The motion vector MV3 is input into the interpolated pixel data generator 5.

The interpolated pixel data generator 5 includes plural line memories and a pixel delay part (not shown) used to delay pixel data in the current frame F0 in a horizontal direction and a vertical direction and generate pixel data within a certain range of the current frame F0 in the horizontal direction and the vertical direction, and plural line memories and a pixel delay part (not shown) used to delay pixel data in the frame F1 in a horizontal direction and a vertical direction and generate pixel data within a certain range of the frame F1 in the horizontal direction and the vertical direction. The interpolated pixel data generator 5 further includes an averaging part that selects pixel data in the current frame F0 and pixel data in the frame F1 according to the motion vector MV3 and averages them to generate interpolated pixel data.

In the present embodiment, although the interpolated pixel data is generated using two pieces of pixel data in two real frames, the interpolated pixel data may be generated using three pieces of pixel data or more in three real frames or more.

Pixel data in the frame F0 and interpolated pixel data from the interpolated pixel data generator 5 are sequentially input into the frame frequency converter 6. The frame frequency converter 6 may be composed of a time series conversion memory. The frame frequency converter 6 generates image data of the frame F0 which is a real frame based on the pixel data in the frame F0 sequentially input, and image data of an interpolated frame F1 which is an interpolated frame based on the interpolated pixel data sequentially input from the interpolated pixel data generator 5.

Then, the frame frequency converter 6 alternately selects the image data of the frame F0 and the image data of the interpolated frame Fi at a frequency of 120 Hz, and outputs a video signal Sout with a frame frequency of 120 Hz.

Figure 2:
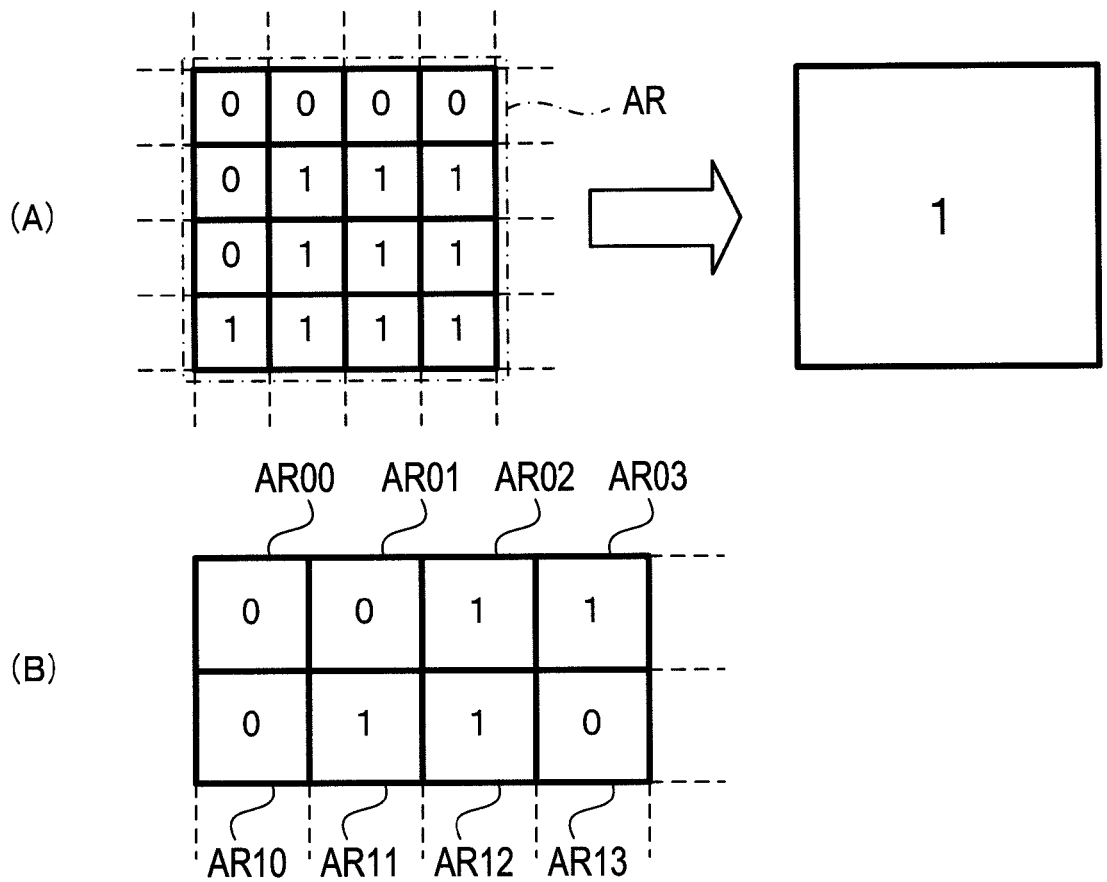
FIG. 2 It is a diagram that illustrates a first example of operation of a motion vector state determiner 3 in FIG. 1.

The concrete operation of the motion vector state determiner 3 will be described below. First, a first example of the operation of the motion vector state determiner 3 will be described with reference to FIG. 2. FIG. 2 conceptually illustrates operation carried out in the first example. The motion vector state determiner 3 segments a screen of one frame into plural regions. The number of segmented regions into which a screen of one frame is segmented may be arbitrarily determined. FIG. 2(A) shows a segmented region AR. Plural pixels are included in the segmented region AR. The number of pixels included in the segmented region AR is dependent on the number of segmented regions AR. In one case of detecting the motion vector MV1 in a pixel data unit, plural motion vectors MV1 of which the number is equal to the number of pixels in the segmented region AR appear. In another case of detecting the motion vector MV1 in a block unit composed of plural pieces of pixel data, plural motion vectors MV1 of which the number is equal to the number of blocks in the segmented region AR appear.

The motion vector state determiner 3 determines whether or not a motion vector MV1 appears at every detection unit of motion vector MV1 in the segmented region AR, and sets "1" if the motion vector MV1 appears or sets "0" if the motion vector MV1 does not appear. Then, the motion vector state determiner 3 counts the number of appearances of motion vectors MV1 by summing "1" in the segmented region AR. When the number of appearances of motion vectors MV1 (count value) exceeds a predetermined threshold, the motion vector state determiner 3 assigns "1" to the segmented region AR as a determination value for segmented region, as indicated at the right side of an arrow in FIG. 2(A). When the number of appearances of motion vectors MV1 does not exceed the predetermine threshold, the motion vector state determiner 3 assigns "0" to the segmented region AR as a determination value for segmented region. For example, half the number of detection units is set as a threshold, and when the number of appearances of motion vectors MV1 exceeds half the number of detection units, "1" is assigned.

FIG. 2(B) shows a state of assigning a determination value for segmented region "0" or "1" to each of segmented regions AR00, AR01, AR02, AR03 . . . , AR10, AR11, AR12, AR13 in the screen. The motion vector state determiner 3 counts the number of segmented regions AR each to which a determination value for segmented region "1" is assigned, by summing determination values for segmented regions assigned to all segmented regions AR in the screen. Then, the motion vector state determiner 3 outputs a determination signal D1, which represents one of eight-level state determination values of "0" to "7" for example, according to the count value.

As described above, in the first example of the operation of the motion vector state determiner 3, the determination signal D1 which represents how many motion vectors MV1 appear in one frame (screen) is generated. That is, in the first example, the determination signal D1 which represents the number of appearances of motion vectors MV1 in one frame is generated without consideration of a direction of motion vector MV1. The state determination value increases as the number of appearances of motion vectors MV1 increases. A large state determination value indicates that the motion vectors MV1 stabilize.

Figure 3:
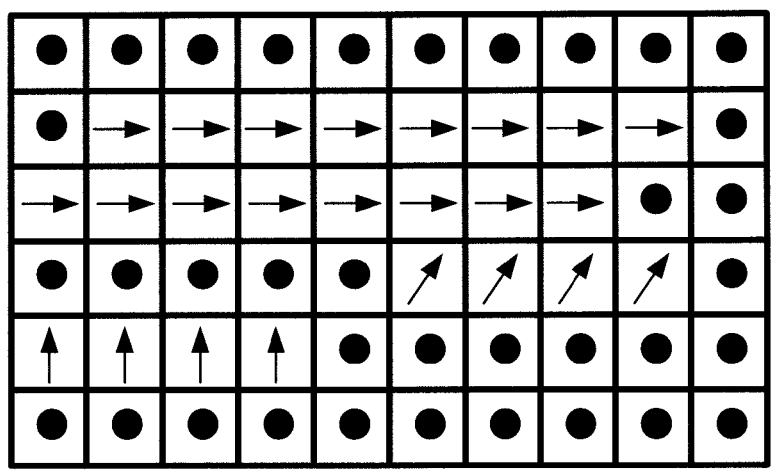
FIG. 3 It is a diagram that illustrates a second example of operation of the motion vector state determiner 3 in FIG. 1.

Next, a second example of the operation of the motion vector state determiner 3 will be described with reference to FIG. 3. FIG. 3 conceptually illustrates how a motion vector MV1 appears every a detection unit of motion vector MV1 in one frame. A black circle indicates a state (motion "0") where a motion vector MV1 is not detected and corresponds to a value "0" in a matrix at the left side of the arrow in FIG. 2(A). In the example of FIG. 3, a motion vector MV1 directed to a right direction, a motion vector MV1 directed to an upper direction, and a motion vector MV1 directed to an upper right direction appear, as pointed by respective arrows.

The motion vector state determiner 3 determines how motion vectors MV1 are distributed in one frame. As one example, motion vectors MV1 are classified into the following nine types based on a direction of motion vector MV1 in a horizontal direction and a vertical direction. A symbol (0, 0) indicates that there is not a motion in the horizontal direction and the vertical direction. A symbol (+, 0) indicates that there is a motion in a right direction and there is not a motion in the vertical direction. A symbol (−, 0) indicates that there is a motion in a left direction and there is not a motion in the vertical direction. A symbol (0, +) indicates that there is not a motion in the horizontal direction and there is a motion in an upward direction. A symbol (0, −) indicates that there is not a motion in the horizontal direction and there is a motion in a downward direction. A symbol (+, +) indicates that there is a motion in the right and upward directions. A symbol (+, −) indicates that there is a motion in the right and downward directions. A symbol (−, +) indicates that there is a motion in the left and upward directions. A symbol (−, −) indicates that there is a motion in the left and downward directions.

The motion vector state determiner 3 classifies motion vectors MV1 into the nine types (0, 0) to (−, −) for every detection unit, and sums the number of motion vectors for each type. Thereby, the motion vector state determiner 3 can determine whether or not motion vectors MV1 in one frame appear in a relatively uniform direction or different directions. For example, the motion vector state determiner 3 generates a state determination value that represents a degree of uniformity or variation of directions of motion vectors MV1 in one frame by a predetermined function using the summation of the number of motion vectors for each type. The state determination value has one of eight-level of "0" to "7" as well as the first example, and is defined as a determination signal D1. That is, in the second example, the determination signal D1 which represents a distribution state of motion vector MV1 in one frame is generated with consideration of a direction of motion vector MV1. The state determination value increases as the degree of uniformity of directions of motion vectors MV1 increases. A large state determination value indicates that the motion vectors MV1 stabilize.

Figure 4:
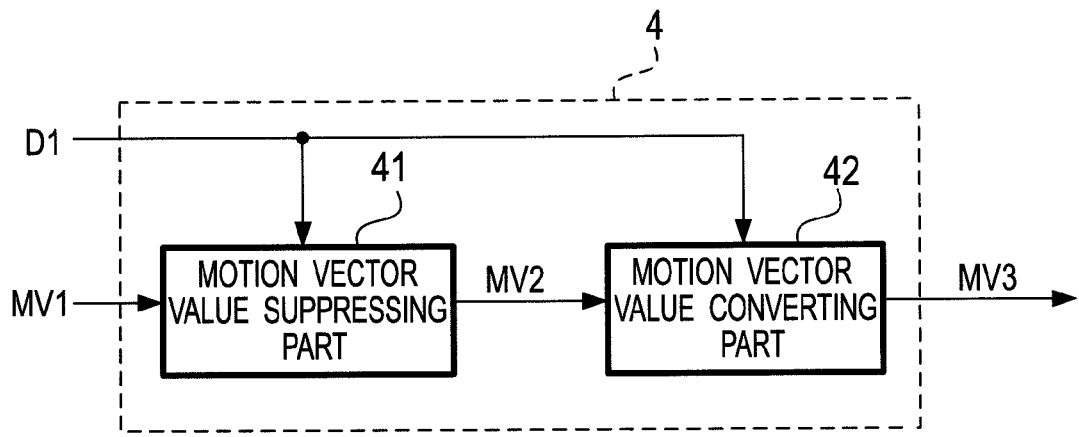
FIG. 4 It is a block diagram that shows a concrete configuration example of a motion vector corrector 4 in FIG. 1.

Next, the configuration and operation of the motion vector corrector 4 will be described. As shown in FIG. 4, the motion vector corrector 4 includes a motion vector value suppressing part 41 and a motion vector value converting part 42. The determination signal D1 is input into the motion vector value suppressing part 41 and the motion vector value converting part 42. When the magnitude of motion vector MV1 exceeds a predetermine value (first threshold), the motion vector value suppressing part 41 suppresses the magnitude of motion vector MV1 and outputs it as a motion vector MV2.

Figure 5:
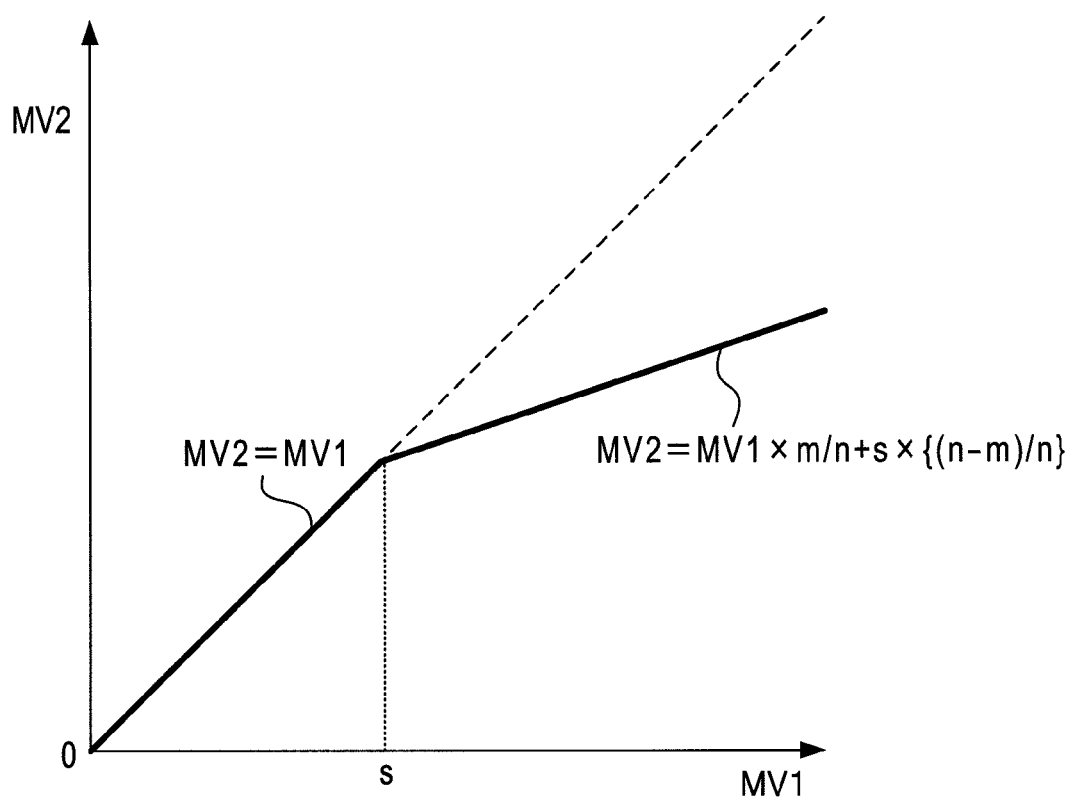
FIG. 5 It is a diagram that illustrates operation of a motion vector value suppressing part 41 in FIG. 4.

FIG. 5 shows characteristics in a state where the motion vector value suppressing part 41 suppresses the magnitude of motion vector MV1. The motion vector value suppressing part 41 sets the motion vector MV1 as a motion vector MV2 within a range in the magnitude of motion vector MV1 from "0" to the first threshold S, and when it exceeds the first threshold S, generates a motion vector MV2 according to the following equation (1).

$$MV2 = MV1 \times m/n + s \times \{(n-m)/n\} \quad (1)$$

In the equation (1), variables m and n are predetermined natural numbers which have the relation of m<n, and these values are arbitrarily set. Although the first threshold S, that is a position which is a start point at which the motion vector MV1 starts to decrease, may be fixed, it is preferable to vary the first threshold S according to the state determination value of the motion vector MV1. It is further preferable to increase the first threshold S as the state determination value increases.

Figure 6:
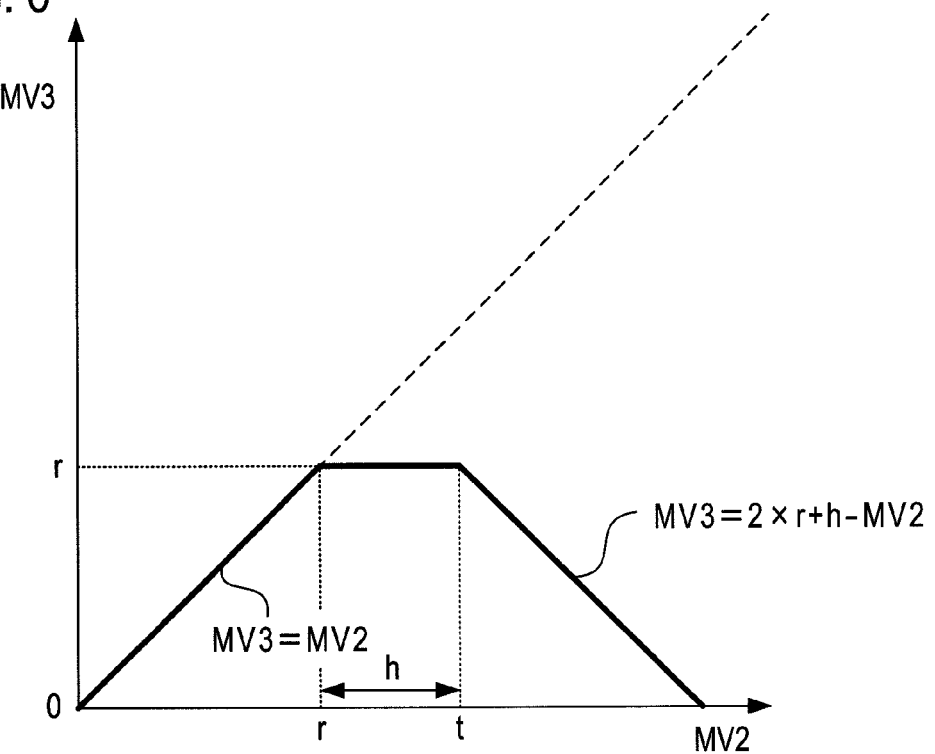
FIG. 6 It is a diagram that illustrates operation of a motion vector value converting part 42 in FIG. 4.

The motion vector MV2 is input into the motion vector value converting part 42. FIG. 6 shows characteristics in a state where the motion vector value converting part 42 converts the magnitude of motion vector MV2. The motion vector value converting part 42 sets the motion vector MV2, which is not changed, as a motion vector MV3 within a range in the magnitude of motion vector M2 from "0" to a second threshold r. The motion vector value converting part 42 holds the motion vector MV3 to a constant value r within a range in the magnitude of motion vector MV2 from the second threshold r to a third threshold t. When the magnitude of motion vector MV2 exceeds the third threshold t, the motion vector value converting part 42 generates a motion vector MV3 according to the following equation (2).

$$MV3 = 2 \times r + h - MV2 \quad (2)$$

According to the equation (2), the magnitude of motion vector MV3 decreases at a predetermined rate to approach "0" when the magnitude of motion vector MV2 exceeds the third threshold t. Although the second threshold r and the range h between the second threshold r and the third threshold t may be fixed, it is preferable to vary them according to the state determination value of the determination signal D1. It is further preferable to increase the second threshold r and the range h as the state determination value increases. Alternately, while the range h is fixed, the second threshold r may be increased as the state determination value increases.

Figure 7:
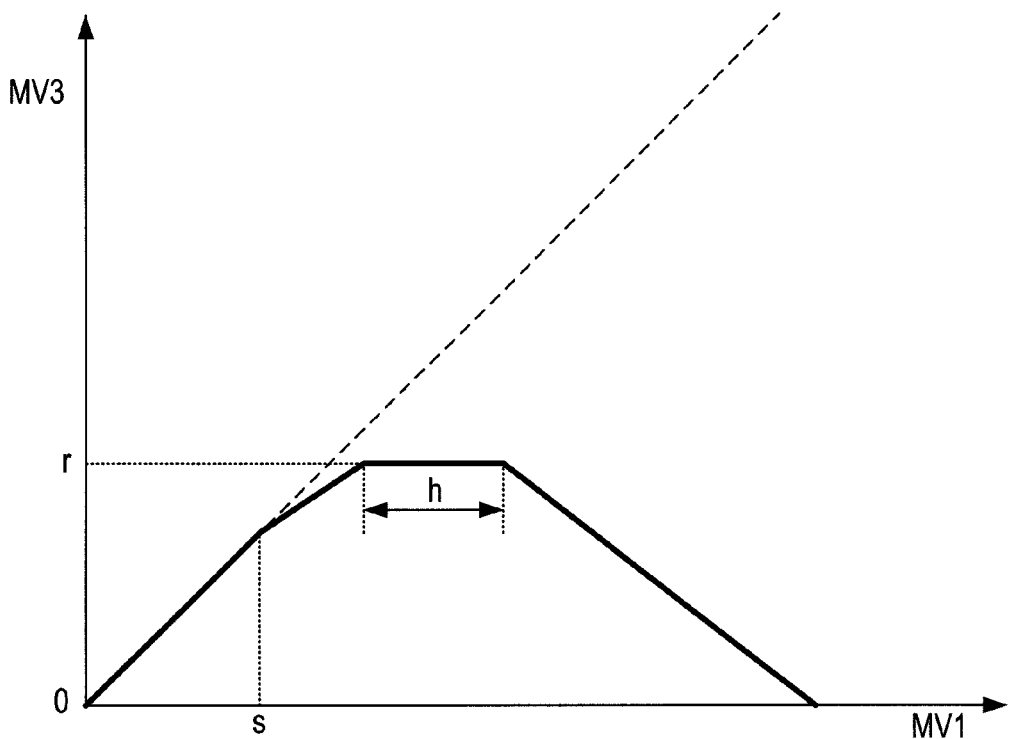
FIG. 7 It is a diagram that illustrates a first example of operation of the motion vector corrector 4 in FIG. 1.
Figure 8:
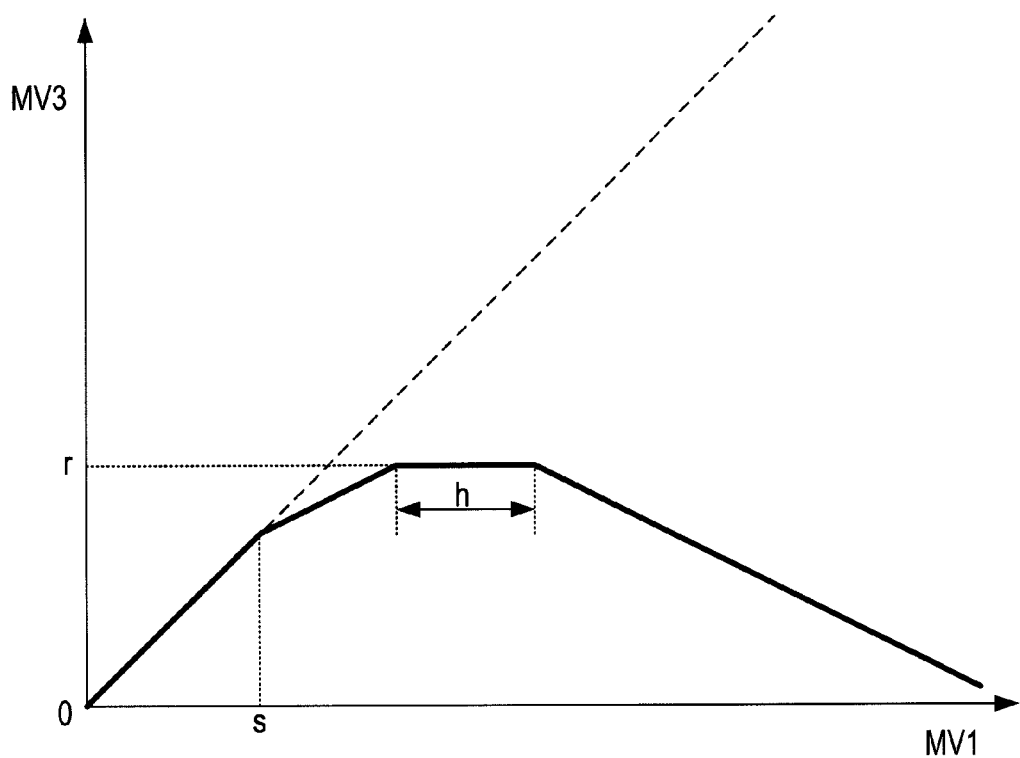
FIG. 8 It is a diagram that illustrates a second example of operation of the motion vector corrector 4 in FIG. 1.
Figure 9:
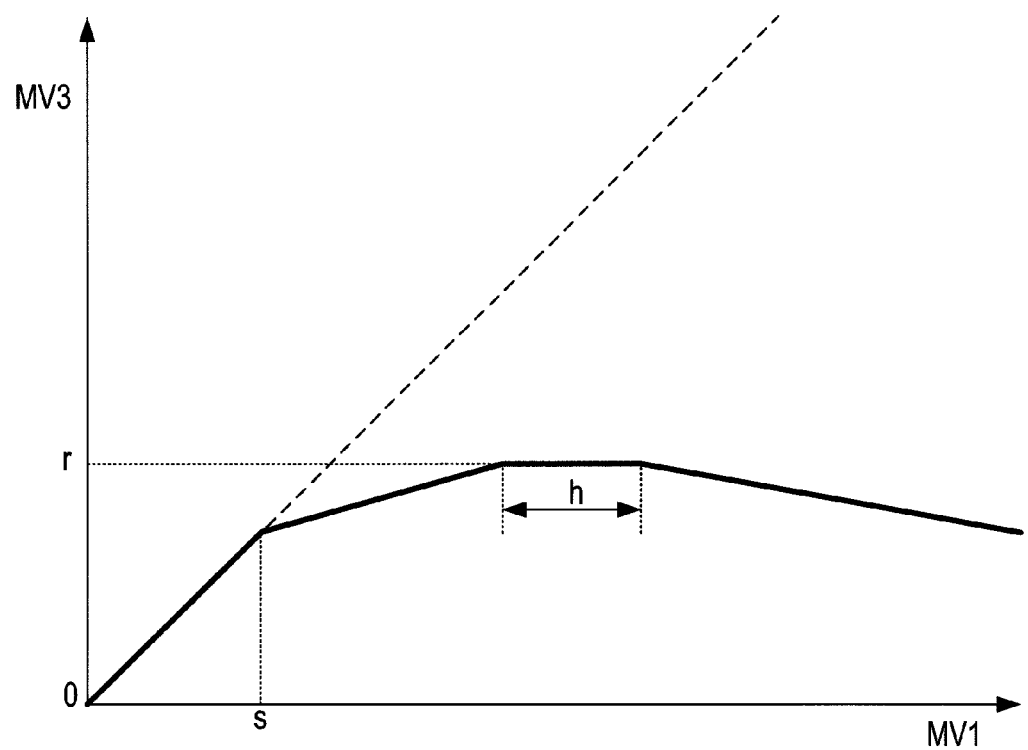
FIG. 9 It is a diagram that illustrates a third example of operation of the motion vector corrector 4 in FIG. 1.

FIGS. 7 to 9 show correction characteristics in respective states where the motion vector corrector 4 corrects the motion vector MV1 to the motion vector MV3 by conversion process according to the equations (1) and (2). FIG. 7 shows correction characteristics in a case where the variables m and n are "3" and "4". FIG. 8 shows correction characteristics in a case where the variables m and n are "1" and "2". FIG. 9 shows correction characteristics in a case where the variables m and n are "1" and "4". As can be seen from FIGS. 7 to 9, as a slope determined by a conversion feature of the equation (1) in a region where the magnitude of motion vector MV1 exceeds the first threshold s gets gentle (magnitude of slope is decreased), a negative slope determined by a conversion feature of the equation (2) in a region where the magnitude of motion vector MV1 exceeds the range h becomes gentle (degree of decrement becomes small).

By correction operations shown in FIGS. 7 to 9 for motion vector MV1 by the motion vector corrector 4, when a degree of motion is large, the motion vector MV3 to be actually used in the interpolated pixel data generator 5 is converged on "0" corresponding to a still vector. This reduces a feeling of visual strangeness in an interpolated image (failure of interpolated image) even when a false detection occurs in the motion vector detector 2. When a motion vector is relatively small, the motion vector 1 is not corrected and is set as a motion vector 3. Thus, if a degree of motion is normal, a good interpolated image can be generated.

In the present embodiment, since the range h where the motion vector MV3 has the constant value r is set as the characteristics of motion vector MV3, a state where the motion vector MV1 is not corrected by the motion vector corrector 4 is smoothly changed into a state where the motion vector MV1 is corrected. This reduces a feeling of visual strangeness in an interpolated image.

The present invention is not limited to the present embodiment described above, and various changes may be made without departing from the scope of the invention. The present invention includes programs for causing a computer to realize functions of elements described in the present embodiment. These programs may be read from a recording medium and then loaded in the computer, or be transmitted via a communication network and then loaded in the computer.

REFERENCE SIGNS LIST 1 frame memory
2 motion vector detector
3 motion vector state determiner
4 motion vector corrector
5 interpolated pixel data generator
6 frame frequency converter
41 motion vector value suppressing part
42 motion vector value converting part

The invention claimed is:

1. A motion vector correction device comprising:
   a circuitry that
     detects, using pixel data in at least two real frames in an input video signal, a first motion vector necessary for generating interpolated pixel data forming an interpolated frame to be inserted between the two real frames, and corrects the first motion vector to decrease the magnitude of first motion vector when the magnitude of first motion vector exceeds a first threshold, wherein when the magnitude of first motion vector exceeds the first threshold, the circuitry decreases the magnitude of first motion vector within a range where the magnitude of first motion vector is larger than the first threshold such that a decrement amount of the magnitude of first motion vector increases as a value between the magnitude of first motion vector and the first threshold increases, and outputs the result as a second motion vector, when the magnitude of second motion vector exceeds a second threshold, the circuitry keeps the magnitude of second motion vector unchanged from the second threshold to a third threshold larger than the second threshold, and outputs the result as a third motion vector, and when the magnitude of second motion vector exceeds the third threshold, the circuitry decreases the magnitude of second motion vector within a range where the magnitude of second motion vector is smaller than the second threshold such that a decrement amount of the magnitude of second motion vector increases as a value between the magnitude of second motion vector and the third threshold increases, and outputs the result as a third motion vector.

2. The motion vector correction device according to claim 1, wherein when the magnitude of second motion vector exceeds the third threshold, the circuitry calculates the third motion vector according to the following calculus equation $$2\times(\text{the second threshold})+(\text{the third threshold}-\text{the second threshold})-(\text{the magnitude of second motion vector}).$$

3. The motion vector correction device according to claim 1, the circuitry determines an appearance state of the first motion vector in a screen to generate and output a state determination value, wherein the circuitry varies characteristics of decrease of the magnitude of first motion vector according to the state determination value.

4. The motion vector correction device according to claim 3, wherein the circuitry generates a state determination value that represents an appearance amount of motion vectors indicating how many first motion vectors appear in a screen.

5. The motion vector correction device according to claim 3, wherein the circuitry generates a state determination value that represents a distribution state of motion vectors indicating a degree of uniformity or variation of directions of first motion vectors in a screen.

6. A video signal processing apparatus comprising:
a circuitry that generates interpolated pixel data, using pixel data in at least two real frames in an input video signal and a motion vector corrected by the motion vector correction device according to claim 1.

7. A motion vector correction device comprising:
a circuitry that
detects, using pixel data in at least two real frames in an input video signal, a first motion vector necessary for generating interpolated pixel data forming an interpolated frame to be inserted between the two real frames, and corrects the first motion vector to decrease the magnitude of first motion vector when the magnitude of first motion vector exceeds a first threshold, wherein when the magnitude of first motion vector exceeds the first threshold, the circuitry decreases the magnitude of first motion vector within a range where the magnitude of first motion vector is larger than the first threshold such that a decrement amount of the magnitude of first motion vector increases as a value between the magnitude of first motion vector and the first threshold increases, and outputs the result as a second motion vector, when the magnitude of second motion vector exceeds a second threshold, the circuitry keeps the magnitude of second motion vector unchanged from the second threshold to a third threshold larger than the second threshold, and outputs the result as a third motion vector, and when the magnitude of second motion vector exceeds the third threshold, the circuitry decreases the magnitude of second motion vector within a range where the magnitude of second motion vector is smaller than the second threshold such that a decrement amount of the magnitude of second motion vector increases as a value between the magnitude of second motion vector and the third threshold increases, and outputs the result as a third motion vector, and wherein the circuitry calculates the second motion vector according to the following calculus equation $$\text{the magnitude of first motion vector})\times m/n+\text{the first threshold})\times(n-m)/n,$$

where variables m and n are natural numbers which have a relation of m<n.

8. The motion vector correction device according to claim 7 wherein when the magnitude of second motion vector exceeds the third threshold, the circuitry calculates the third motion vector according to the following calculus equation:

$$2\times(\text{the second threshold})+(\text{the third threshold}-\text{the second threshold})-(\text{the magnitude of second motion vector}).$$

9. The motion vector correction device according to claim 7, the circuitry determines an appearance state of the first motion vector in a screen to generate and output a state determination value, wherein the circuitry varies characteristics of decrease of the magnitude of first motion vector according to the state determination value.

10. A video signal processing apparatus comprising:
a circuitry that generates interpolated pixel data, using pixel data in at least two real frames in an input video signal and a motion vector corrected by the motion vector correction device according to claim 7.

11. A motion vector correction method comprising:
a motion vector detection step for, using pixel data in at least two real frames in an input video signal, detecting a first motion vector necessary for generating interpolated pixel data forming an interpolated frame to be inserted between the two real frames; and a motion vector correction step for correcting the first motion vector to decrease the magnitude of first motion vector when the magnitude of first motion vector exceeds a first threshold, wherein the motion vector correction step includes:
a motion vector value suppressing step for decreasing, when the magnitude of first motion vector exceeds the first threshold, the magnitude of first motion vector within a range where the magnitude of first motion vector is larger than the first threshold such that a decrement amount of the magnitude of first motion vector increases as a value between the magnitude of first motion vector and the first threshold increases, and outputting the result as a second motion vector; and a motion vector value converting step for keeping, when the magnitude of second motion vector exceeds a second threshold, the magnitude of second motion vector unchanged from the second threshold to a third threshold larger than the second threshold, and outputting the result as a third motion vector, and decreasing, when the magnitude of second motion vector exceeds the third threshold, the magnitude of second motion vector within a range where the magnitude of second motion vector is smaller than the second threshold such that a decrement amount of the magnitude of second motion vector increases as a value between the magnitude of second motion vector and the third threshold increases, and outputting the result as a third motion vector.

12. The motion vector correction method according to claim 11, wherein when the magnitude of second motion vector exceeds the third threshold, the motion vector value converting step calculates the third motion vector according to the following calculus equation 2×(the second threshold)+(the third threshold−the second threshold)−(the magnitude of second motion vector).

13. The motion vector correction method according to claim 11, further comprising a motion vector state determination step for determining an appearance state of the first motion vector in a screen to generate a state determination value, wherein the motion vector correction step varies characteristics of decrease of the magnitude of first motion vector according to the state determination value.

14. The motion vector correction method according to claim 13, wherein the motion vector state determination step generates a state determination value that represents an appearance amount of motion vectors indicating how many first motion vectors appear in a screen.

15. The motion vector correction method according to claim 13, wherein the motion vector state determination step generates a state determination value that represents a distribution state of motion vectors indicating a degree of uniformity or variation of directions of first motion vectors in a screen.

16. A video signal processing method comprising:

an interpolated pixel data generation step for generating interpolated pixel data, using pixel data in at least two real frames in an input video signal and a motion vector corrected by the motion vector correction method according to claim 11.

\* \* \* \* \*